United States Patent Office 2,703,967
Patented Mar. 15, 1955

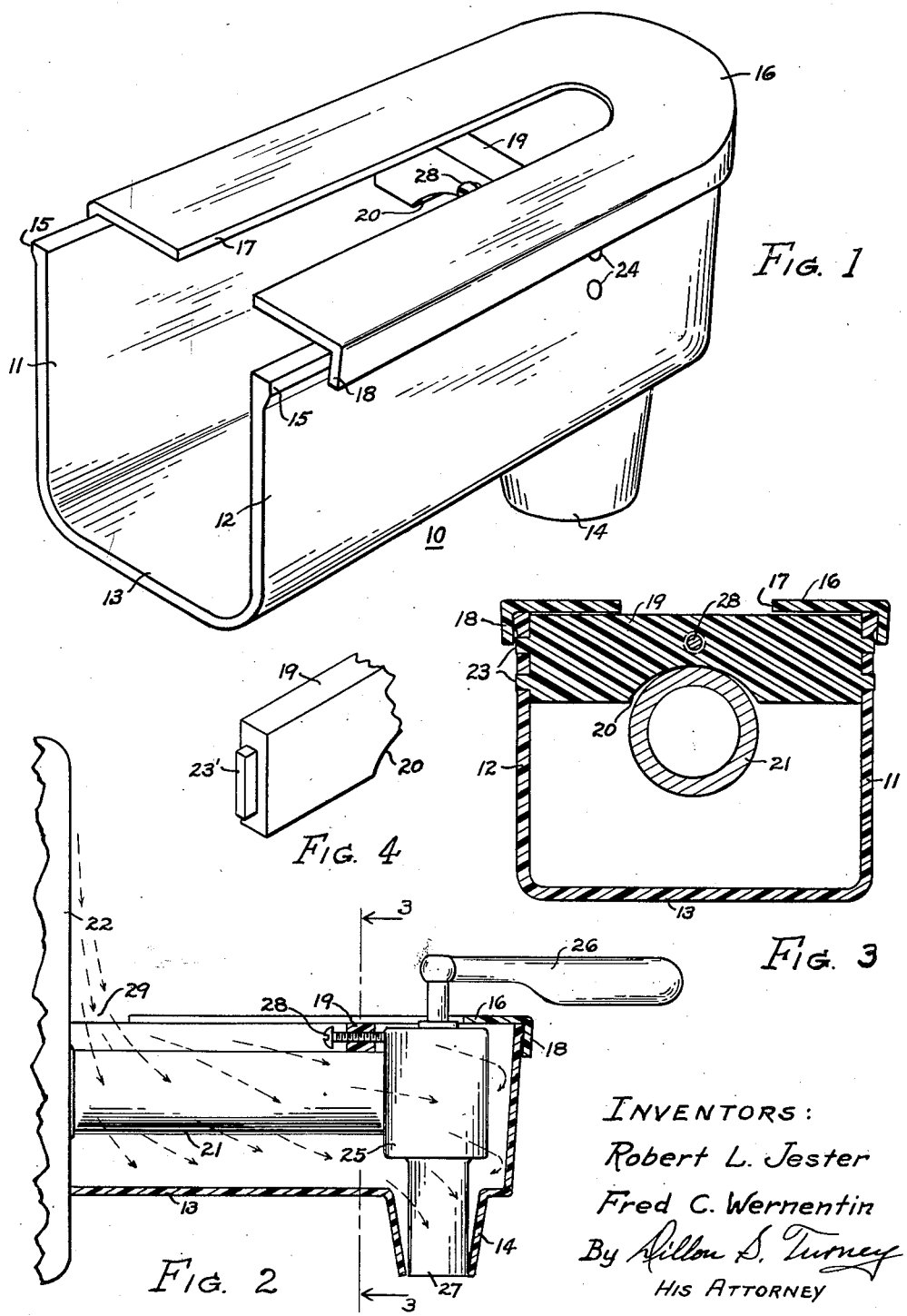

2,703,967

COOLING AND HEAT INSULATING JACKET FOR DISPENSING FAUCETS

Robert L. Jester and Fred C. Wernentin, Fairfield, Iowa

Application June 16, 1954, Serial No. 437,249

7 Claims. (Cl. 62—114)

This invention relates in general to improvements in ice cream or congealed product freezing equipment of the continuous type, and more particularly to an improved device for insulating and cooling the dispensing faucet of such equipment.

In recent years, there has been a wide growth of ice cream freezers of the instantaneous and continuous type wherein an ice cream or food product is agitated and frozen or congealed during its continuous passage through the freezing machine. The machines themselves have been well designed so that the frozen or congealed product is maintained at the proper temperature and consistency at the point of discharge through the dispensing faucet. However, a serious problem has always been present in preventing the warming or thawing of that part of the frozen product which remains in the dispensing faucet during intervals between the drawing of the product from the faucet. Such faucets are usually positioned a distance in front of the freezer proper for convenient access, and provided with an operating handle so that the frozen product may be easily dispensed into cups or other containers. Since the faucet is exposed to the warm or hot room air surrounding the equipment, considerable melting occurs of that part of the product which remains in the faucet with the result that each time the faucet is operated the first portion withdrawn must be discarded because of its melted or unsatisfactory condition, which results in considerable waste over a period of time. It is therefore desirable that means be provided for totally or partially enclosing the exposed faucet and supply pipe and insulating this portion of the equipment from the warm surrounding temperature, and it is also desirable to provide means for introducing a cooling fluid or medium into the area around said faucet, and for maintaining such cooling medium in close proximity with the dispensing faucet.

Accordingly, it is an object of this invention to provide a heat insulating jacket designed to substantially enclose the dispensing faucet of an ice cream freezer of the continuous type.

It is another object of this invention to provide means for conducting air cooled by contact with the freezing equipment itself into close proximity with the dispensing faucet of such equipment.

It is a further object of this invention to provide a heat insulating and cold retaining enclosure which may be quickly applied to the dispensing faucet of an ice cream freezer.

It is another object of this invention to provide an enclosure for the dispensing faucet of an ice cream machine of the continuous type which is simple in construction, economical in cost and may be readily applied or removed from the faucet for cleaning purposes.

It is still a further object of this invention to provide a heat insulating jacket for a faucet which is simply constructed of several easily interlocked parts, rigidly held in position, and which is attractive in appearance.

Other objects and advantages will be apparent from a description of the subject invention and the invention will be better understood from the following detailed description thereof taken in connection with the accompanying drawings and its scope will be pointed out in the appended claims.

In the drawings, Figure 1 is a perspective view of an assembled faucet cooling jacket according to this invention.

Figure 2 is a cross section view through the faucet cooling jacket showing it installed in proper position on the dispensing faucet of an ice cream freezing machine.

Figure 3 is a cross section view taken along the lines 3—3 of Figure 2 showing the method of supporting the cooling jacket; and Figure 4 is a perspective view of one end of the supporting member utilized to support the jacket on the dispensing faucet.

Referring now to Figure 1, it will be noted that the heat insulating and cold confining shield comprises a U shaped body, generally indicated at 10, comprising a pair of upstanding side walls 11 and 12, integrally formed with the bottom portion 13, and being closed at one end, the right end, thereof. Integrally formed in the bottom portion 13 is a depending conical portion 14 which is designed to surround the outlet nozzle of a dispensing faucet as seen in Figure 2.

A continuous enlarged bead 15 is formed extending around the entire upper edge of the entire body member 10, this bead cooperating with the slidable top closure 16 as will be subsequently explained. The slidable top closure 16, which is somewhat shorter in length than the overall length of the body 10, is provided with an open longitudinal slot 17 extending the greater portion of its length and open at one end thereof, as shown, and is also formed with the downwardly and inwardly turned continuous flange 18 which extends around the periphery of the cover 16 and in overlapping gripping engagement with the enlarged bead 15. The gripping action of the flange 18 upon the bead 15 may be seen in Figure 3. Thus from the drawings it will be apparent that the cover 16 and its downturned flange 18 cooperates with the bead 15 so that a close and secure sliding fit results between the cover 16 and the body member 10, the entire assembly forming substantially a complete enclosure except for the open left end thereof and the open slot 17 in the top of the cover 16.

As seen in the cross section view in Figure 3, in order to support the enclosing body member 10 from a dispensing faucet, a pipe engaging transverse bar 19, having a recessed portion 20 centrally located in its undersurface, is provided which is designed to rest upon the main frozen product discharge pipe 21 which extends outwardly from the main freezer machine head 22. The cross member 19 is provided at each end thereof with a pair of extended studs or pins 23 which are designed to fit into the cooperating apertures 24 in each side portion 11 and 12, of the body member 10. Thus, in Figure 3 it will be noted that the cross member 19 is securely and rigidly held in position within the body 10 when the studs 23 are secured in the holes 24, and spreading of the body member 10 and consequent dislocation of the support bar 19 is prevented by the inwardly turned flanges 18 of the slidable cover 16. Thus, the entire assembly becomes a rigid, unitary structure which is supported from the top of the ice cream discharge pipe 21 by the cross bar 19, and totally surrounds the faucet.

Figure 4 shows an alternate form of cross bar support, in which a single rectangular extended pin 23' may be provided on each end of the cross bar 19, and which will engage with a cooperating aperture (not shown) in each of the body sides 11 and 12.

Referring to Figure 2, there is shown a cross section view of the enclosing jacket secured in place on a conventional dispensing faucet of a continuous ice cream freezer, the faucet consisting of the valve or body part 25 which is operated by the rotatable handle 26 and has a discharge nozzle 27 extending downwardly therefrom. This figure shows the enclosing jacket in place, and also shows the threaded adjusting screw 28 which is centrally located in a tapped hole in the cross bar 19, the point of the screw 28 bearing against the upper head surface of the valve body 25. By a tightening adjustment of the screw 28, the entire jacket assembly may be forced to the left, as viewed in Figure 2, until the jacket is held tightly and rigidly against the head 22 of the freezing machine. When the enclosure is in place as shown in Figure 2, the dispensing faucet assembly is almost completely enclosed except for the aperture 29 extending across the width of the body 10 and positioned immediately adjacent the freezer head 22. This aperture 29 is purposely formed by making the overall length of the slidable cover 16 less than the length of the body 10, as shown in Figures 1 and 2 and as previously mentioned, and is important in that it permits air which has been cooled by contact with the freezer head 22, which is usually cold and frost covered, to flow downwardly and into the enclosed space surrounding the dispensing faucet assembly. The direction and pattern of flow of air which has been cooled by contact with the cold freezer head 22 is illustrated by the dotted directional arrows appearing on Figure 2.

Obviously a wide range in choice of materials may be used for the subject invention, among such suitable materials being cast light metal such as aluminum, or any of the numerous strong and light weight plastics or other synthetic compositions. A desirable and suitable material known to the inventors is a transparent plastic of the "Lucite" or "Plexiglas" type which is pleasing in appearance, easily shaped and formed, and easily cleaned, thereby preserving the sanitary aspects of the freezer and dispensing faucet. While certain materials have been mentioned as suitable for this application, it will be apparent that the invention can be made of other materials and a limitation on the method and materials of construction is not to be construed from the foregoing mention of certain preferred materials.

It has been found that this cooling shield or jacket is adaptable to and will fit a wide variety of dispensing faucets. In first placing the jacket into use it is necessary only to measure the distance from the faucet discharge 27 to the freezer head 22 and then cut the open or left end of the body 10 to fit that distance so that the conical portion 14 will coincide with and surround the faucet discharge 27 when the open end of the body is tight and flush against the freezer head 22.

From experience, it has been found that this enclosing shield or jacket prevents thawing of the ice cream or frozen product which is in the pipe 21 due to two primary reasons. First, the provision of a dead air space which serves to insulate the pipe and faucet assembly from external warm air currents circulating around the assembly, and secondly, by providing a surrounding receptacle for trapping and holding cold air which has been cooled by contact with the freezer head 22, and which has flowed into the jacket due to gravity effect.

The device is extremely simple and easy to take on and off since it is only necessary to slide the cover plate 16 off toward the right. This allows the sides 11 and 12 of the body 10 to be sprung outwardly thereby releasing the engaging pins 23 which hold the cross bar 19 in place. The bar 19 may be then lifted out after which the entire body assembly can be removed downwardly and away from the faucet assembly. In reinstalling the device after it has been cleaned, it is only necessary to reverse the procedure just outlined. As mentioned before, the invention is cheaply and easily manufactured, especially in formable plastic or synthetic materials, and results in the saving of considerable quantity of ice cream or other frozen or congealed products which normally would be lost and wasted due to its having melted or thawed to an undesirable degree while in the pipe 21 and faucet body 25.

While I have shown and described a particular embodiment of my invention, it will be apparent to those skilled in the art that certain changes and modifications may be made therein without departing from my invention in its broader aspects and I, therefore, aim in the appended claims to cover any such modifications as may be made without departing from the true spirit and scope of this invention.

What we claim as new and desire to secure by Letters Patent of the United States is:

1. In combination with a continuous ice cream freezing machine having a horizontally extending discharge faucet, a heat insulating jacket substantially surrounding said faucet in spaced relationship thereto, said jacket comprising a U-shaped body portion open at one end and closed at the other end thereof, a slidable top cover plate for said body portion, a transverse support inter- connecting the sides of said U-shaped body member for supporting said body member from said faucet, and means for adjusting the lengthwise position of said jacket relative to said faucet.

2. In combination with a continuous food freezing machine having an external discharge faucet, a heat insulating jacket substantially enclosing said faucet in spaced relationship thereto, said jacket comprising a U-shaped body portion open at one end and closed at the other end thereof, an enlarged bead formed in and coextensive with the upper edges of said body portion, a slidable cover plate for said body portion having a peripheral inturned flange for engagement with said bead, and support means interconnecting the sides of said U-shaped body member and locked in position by said cover plate for supporting said body member from said faucet.

3. A cooling jacket for enclosing the discharge faucet of a food freezing machine comprising, an elongated body member formed of parallel sides, a bottom closure and a closure at one end thereof, said open end of said body member being disposed in contact with said freezing machine, a transverse support member extending between said side portions and having interlocking means on each end thereof for engagement with said side portions, a longitudinally slidable cover plate for substantially closing the open top of said body member, and means including an aperture in said cover plate located adjacent said freezing machine for permitting gravity flow of cooled air from said freezing machine to the interior of said body member.

4. A cooling jacket for enclosing the discharge faucet of a food freezing machine comprising, an elongated body member formed of parallel sides, a bottom closure and a closure at one end thereof, said open end of said body member being disposed in contact with a cooled surface of said freezing machine, a transverse support member extending between said side portions and having means on each end thereof for locking engagement with said side portions, a longitudinally slidable cover plate for substantially covering said body member on the top thereof and operative to lock said transverse support member in place when said cover plate is in position, and means including an aperture in said cover plate located adjacent said food freezing machine for permitting gravity flow of cooled air to the interior of said body member.

5. A cooling jacket for enclosing the discharge faucet of an ice cream freezing machine comprising, an elongated body member formed of parallel sides, a bottom closure and a closure at one end thereof, said open end of said body member being disposed in contact with a cooled surface of said freezing machine, a transverse support member extending between said side portions and having interlocking means on each end thereof for engagement with said side portions, a recess in said support member cooperating with said faucet, a longitudinally slidable cover plate for substantially enclosing said body member and operative to lock said transverse support in place when said cover plate is in position, threaded adjustment means on said support member for varying the position of said support relative to said faucet, and means including an aperture in said cover plate located adjacent said freezing machine for admitting cooled air to the interior of said body member.

6. A heat insulating jacket for use in enclosing the discharge faucet of a continuous type ice cream freezing machine comprising, a pair of side portions integrally formed with a bottom portion and an end portion at one end thereof, a removable cover plate having a longitudinal slot extending from one end thereof over half the length of said plate, means on said plate for securing said plate to said jacket, support means transversely positioned in said jacket for supporting said jacket assembly from said faucet, and means on said support means for longitudinally positioning said jacket relative to said faucet.

7. A heat insulating jacket for use in enclosing the discharge faucet of a continuous type ice cream freezing machine comprising, a pair of side portions integrally formed with a bottom portion and an end portion at one end thereof, a depending conical shaped faucet enclosing portion adjacent one end of said bottom portion, an outwardly extending bead around the upper edge of said side portions and said end portion, a slidable cover plate having a longitudinal slot extending from one end thereof over half the length of said plate, a depending inturned flange around the periphery of said plate for cooperation with said bead to secure said plate to said jacket, support means transversely positioned in said jacket near its upper portion and maintained in position by said inturned flange for supporting said jacket assembly from said faucet, and means on said support means for longitudinally adjusting said jacket relative to said faucet.

References Cited in the file of this patent

UNITED STATES PATENTS 2,282,662   Lindsey _____ May 12, 1942